United States Patent
Shoemaker

[11] 3,790,255
[45] Feb. 5, 1974

[54] ZOOM LENS SYSTEM
[75] Inventor: Arthur H. Shoemaker, E. Aurora, N.Y.
[73] Assignee: American Optical Corporation, Southbridge, Mass.
[22] Filed: Sept. 11, 1972
[21] Appl. No.: 288,231

[52] U.S. Cl.................. 350/184, 350/176, 350/214
[51] Int. Cl. ............................................ G02b 15/16
[58] Field of Search............................ 350/184, 186

[56] References Cited
UNITED STATES PATENTS
3,640,605 2/1972 Sissel ................................. 350/184
3,030,861 4/1962 Mortimer et al..................... 350/184

Primary Examiner—John K. Corbin
Attorney, Agent, or Firm—Alan H. Spencer; William C. Nealon

[57] ABSTRACT

An eight component afocal zoom system is provided characterized by extremely short length considering the zoom range and its field and aperture size. A substantially flat image field is obtained through a zoom range of substantially to 2.54.

3 Claims, 1 Drawing Figure

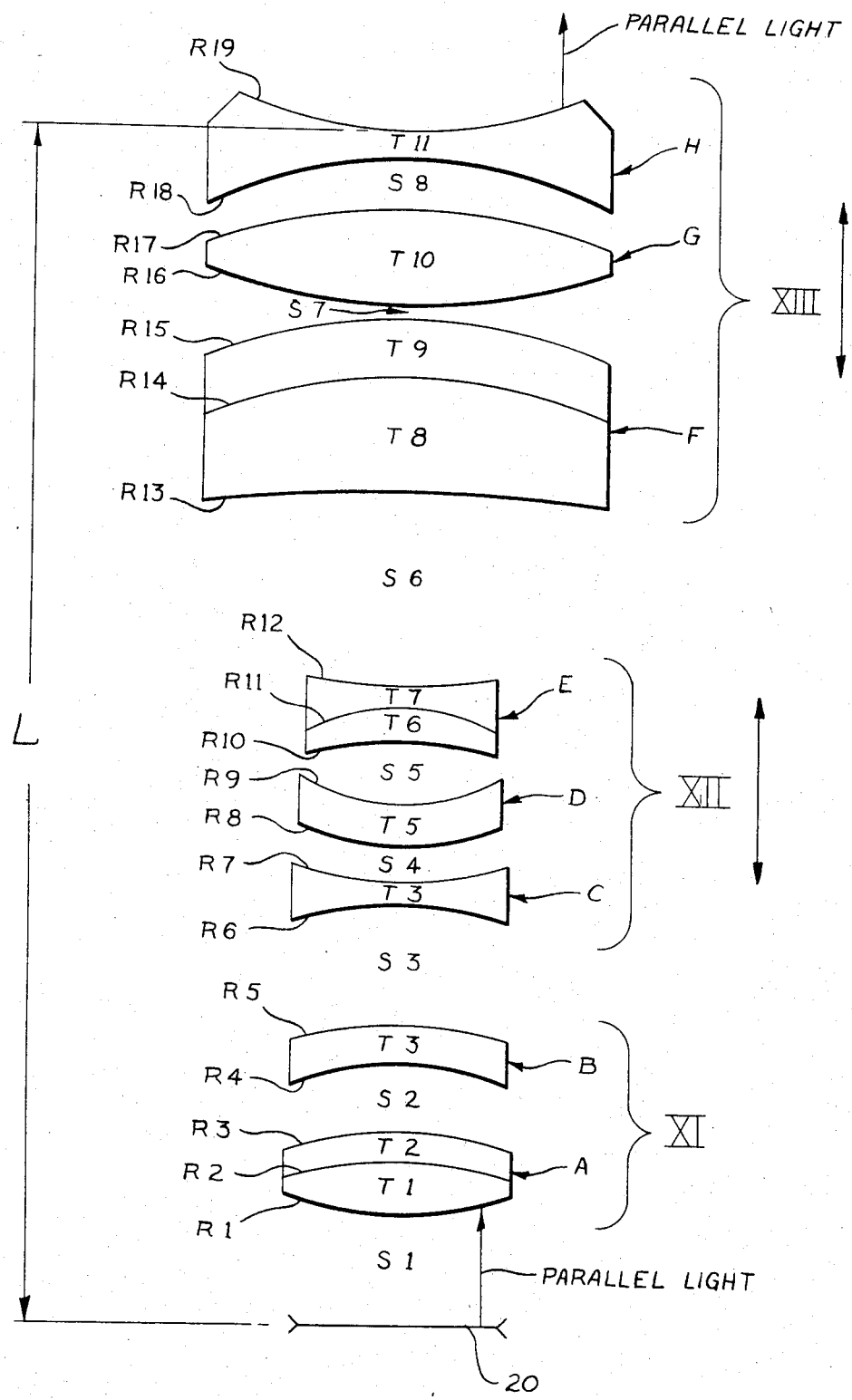

ZOOM LENS SYSTEM

BACKGROUND OF THE INVENTION

The present invention relates to afocal optical devices for obtaining from a given object at infinity, a well corrected image which remains substantially fixed, although the angular size of the image may be progressively varied between two predetermined limits by a suitable displacement of a number of the elements of the device.

OBJECTS OF THE INVENTION

It is an object of this invention to provide an optical device well suited for use as a zoom attachment to an infinity corrected microscope system whose image, as well as being well corrected for the usual chromatic aberrations, spherical aberrations, coma, and astigmatism, has a substantially flat image field throughout a zoom range of substantially 1 to 2.5X

DRAWING

The drawing is an optical diagram of a zoom optical system according to the present invention.

DESCRIPTION

The drawing is an optical diagram of the preferred form of the present invention wherein the numeral X designates the system in general. The system is comprised of a front stationary lens group, group XI, spaced away from the entrance pupil surface 20 at a distance designated S1. Rearward of, and optically aligned with XI, are the two zoom groups, groups XII and XIII respectively whose variable spaces are designated S3 and S6. The zoom groups serve to vary the angular subtense of the object.

The system is comprised of eight optically aligned components designated A, B, C, D, E, F, G, and H respectively. Group XI is comprised of a positive double convex doublet, component A, and a concavo convex negative singlet, component B. Group XII is comprised of component C, a negative double convex singlet; component D, a convex concavo negative singlet; and component E, a negative double convex doublet. Finally, group XIII is comprised of a concavo convex positive doublet, component F; a double convex positive singlet, component G; and a double concave negative singlet, component H.

The successive air spaces of the system are designated S1 to S8 respectively, while successive axial lens thicknesses are designated T1 to T11. Successive radii of curvature are designated R1 to R19 respectively where the minus sign (−) applies to surfaces whose center of curvature lies on the entrance pupil side of their vertices. The refractive indices and Abbe numbers of the glasses in the successive lenses are designated ND (1) to ND (11) and $\nu$ (1) to $\nu$ (11) respectively.

In the table below a list of the lens parameters is given in terms of L, the over-all length of the system at the 1X position (see the drawing).

| Radius R | Thickness T | Space S | Refractive Index ND | Abbe Number $\nu$ |
|---|---|---|---|---|
| | | S1=0.0927L | | |
| R1=0.3154L | | | | |
| | T1=0.0397L | | ND1=1.51821 | $\nu$1=65.10 |
| R2=−0.2636L | | | | |
| | T2=0.0199L | | ND2=1.80518 | $\nu$2=25.43 |
| R3=−0.3885L | | | | |
| | | S2=0.0751L | | |
| R4=−0.3324L | | | | |
| | T3=0.0199L | | ND3=1.78847 | $\nu$3=50.48 |
| R5=−0.8341L | | | | |
| | | (1.0X) S3=0.0559L | | |
| | | (1.7X) S3=0.1317L | | |
| | | (2.5X) S3=0.1664L | | |
| R6=−1.1806L | | | | |
| | T4=0.0187L | | ND4=1.51821 | $\nu$4=65.10 |
| R7=0.3284L | | | | |
| | | S4=0.0227L | | |
| R8=0.1664L | | | | |
| | T5=0.0368L | | ND5=1.80518 | $\nu$5=25.43 |
| R9=0.1664L | | | | |
| | | S5=0.0258L | | |
| R10=−0.4546L | | | | |
| | T6=0.0275L | | ND6=1.80518 | $\nu$6=25.43 |
| R11=−0.1422L | | | | |
| | T7=0.0205L | | ND7=1.78847 | $\nu$7=50.48 |
| R12=0.4384L | | | | |
| | | (1.0X) S6=0.2961L | | |
| | | (1.7X) S6=0.1675L | | |
| | | (2.5X) S6=0.0203L | | |
| R13=−7.9799L | | | | |
| | T8=0.1003L | | ND8=1.78847 | $\nu$8=50.48 |
| R14=−0.2443L | | | | |
| | T9=0.0311L | | ND9=1.80518 | $\nu$9=25.43 |
| R15=−0.6294L | | | | |
| | | S7=0.0037L | | |
| R16=0.3880L | | | | |
| | T10=0.0572L | | ND10=1.61772 | $\nu$10=49.78 |
| R17=−1.7885L | | | | |
| | | S8=0.0247L | | |
| R18=−1.0210L | | | | |
| | T11=0.0317L | | ND11=1.48749 | $\nu$11=70.45 |
| R19=0.3283L | | | | |

Numerically stated, the constructional data for one successful form of the invention may be obtained by multiplying the radius, thickness, and space variously set forth in the table above by the length L. In the preferred embodiment L = 75.48 millimeters. The refractive indices and Abbe numbers, since they are absolute values, are stated in the table above.

| Radius R | Thickness T | Space S | Refractive Index ND | Abbe Number $\nu$ |
|---|---|---|---|---|
| | | S1=7.000 | | |
| R1=28.805 | | | | |
| | T1=3.000 | | ND1=1.51821 | $\nu$1=65.10 |
| R2=−19.899 | | | | |
| | T2=1.500 | | ND2=1.80518 | $\nu$2=25.43 |
| R3=−29.327 | | | | |
| | | S2=5.665 | | |
| R4=−25.092 | | | | |
| | T3=1.500 | | ND3=1.78847 | 843=50.48 |
| R5=−62.959 | | | | |
| | | (1.0X) S3=4.2213 | | |
| | | (1.7X) S3=9.9440 | | |
| | | (2.5X) S3=12.5600 | | |
| R6=−89.113 | | | | |
| | T4=1.412 | | ND4=1.51821 | $\nu$4=65.10 |
| R7=24.787 | | | | |
| | | S4=1.711 | | |
| R8=12.407 | | | | |
| | T5=2.780 | | ND5=1.80518 | $\nu$5=25.43 |
| R9=12.407 | | | | |
| | | S5=1.947 | | |
| R10=−34.317 | | | | |
| | T6=2.072 | | ND6=1.80518 | $\nu$6=25.43 |
| R11=−10.734 | | | | |
| | T7=1.544 | | ND7=1.78847 | $\nu$7=50.48 |
| R12=33.087 | | | | |
| | | (1.0X) S6=22.3524 | | |
| | | (1.7X) S=12.6420 | | |
| | | (2.5X) S6=1.5340 | | |
| R13=−602.323 | | | | |
| | T8=7.574 | | ND8=1.78847 | $\nu$8=50.48 |
| R14=−8.442 | | | | |
| | T9=2.349 | | ND9=1.80518 | $\nu$9=25.43 |
| R15=−47.509 | | | | |
| | | S7=0.281 | | |
| R16=29.288 | | | | |
| | T10=4.319 | | ND10=1.61772 | $\nu$10=49.78 |
| R17=−135.000 | | | | |
| | | S8=1.863 | | |

R18=−77.065
T11=2.390  ND11=1.48749  ν11=70.-45
R19=24.783

Having thus described the invention in detail and with sufficient particularlity to enable those skilled in the art to practice it, what is desired to have protected by Letters Patent is set forth in the following claims.

What is claimed is:

1. An afocal optical lens system of the zoom type having an extremely short length and a range for use with an infinity correcting microscope system in which the image, as well as being well corrected for chromatic abberations, coma, and astigmatism, has a substantially flat image field through a zoom range of substantially 1 to 2.5X, said system comprised of three sets of lenses, XI, XII, and XIII;

XI being comprised of a positive convex doublet consisting of a double convex lens cemented to a concave convex negative lens, and a second concave convex negative lens;

XII is comprised of a negative double concave singlet, a convex concavo negative singlet and a negative double concave doublet, said doublet comprised of a concave convex positive element cemented to a double concave lens element; and XIII comprised of a concavo convex positive doublet comprised of two concavo convex singlets cemented to each other, a double convex positive singlet and a double concave negative singlet.

2. The zoom lens arrangement of claim 1 in which the parameters of lens radii (R), thicknesses (T), and spacings (S) are expressed in millimeters and a negative sign indicates lens radii on centers of curvature on the object side of the lens

| Radius R | Thickness T | Space S | Refractive Index ND | Abbe Number ν |
|---|---|---|---|---|
| R1=0.3154L | | S1=0.0927L | | |
| R2=−0.2636L | T1=0.0397L | | ND1=1.51821 | ν1=65.10 |
| R3=−0.3885L | T2=0.0199L | | ND2=1.80518 | ν2=25.43 |
| R4=−0.3324L | | S2=0.0751L | | |
| R5=−0.8341L | T3=0.199L | | ND3=1.78847 | ν3=50.48 |
| | | (1.0X) S3=0.559L | | |
| | | (1.7X) S3=0.1317L | | |
| | | (2.5X) S3=0.1664L | | |
| R6=−1.1806L | T4=0.0187L | | ND4=1.51821 | ν4=65.10 |
| R7=0.3284L | | S4=0.0227L | | |
| R8=0.1644L | T5=0.0368L | | ND5=1.80518 | ν5=25.43 |
| R9=0.1644L | | S5=0.0258L | | |
| R10=−0.4546L | T6=0.0275L | | ND6=1.80518 | ν6=25.43 |
| R11=−0.1422L | T7=0.0205L | | ND7=1.78847 | ν7=50.48 |
| R12=0.4384L | | (1.0X) S6=0.2961L | | |
| | | (1.7X) S6=0.1675L | | |
| | | (2.5X) S6=0.0203L | | |
| R13=−7.9799L | T8=0.1003L | | ND8=1.78847 | ν8=50.48 |
| R14=−0.2443L | T9=0.0311L | | ND9=1.80518 | ν9=25.43 |
| R15=−0.6294L | | S7=0.0037L | | |
| R16=0.3880L | T10=0.0572L | | ND10=1.61772 | ν10=49.-78 |
| R17=−1.7885L | | S8=0.0247L | | |
| R18=−1.0210L | T11=0.0317L | | ND11=1.48749 | ν11=70.-45 |
| R19=0.3283L | | | | |

3. The zoom system of claim 2 in which L = 75.48 millimeters.

* * * * *